United States Patent Office 2,784,225
Patented Mar. 5, 1957

2,784,225

CONDENSING ESTERS AND AMINES TO FORM AMIDES

Wilbert J. Humphlett, Rochester, N. Y., assignor to Eastman Kodak Company, Rochester, N. Y., a corporation of New Jersey No Drawing. Application June 9, 1954,
Serial No. 435,646

5 Claims. (Cl. 260—559)

This invention relates to an improved process for preparing amides, and is particularly concerned with an improved method for effecting condensation between an ester and an amine to form the corresponding amide with the concomitant liberation of alcohol.

One of the well known methods for forming amides involves the condensation of an amine and an ester to form the amide with the liberation of alcohol. By this method, a great variety of amides can be formed. As with most chemical reactions, the present processes are concerned with effecting the preparation by a batch reaction. Extensive study has been made of various specific reactions of this kind and the reaction conditions as regards types of reactants, proportions of reactants, temperatures, reaction times, condensation catalysts, and the like have been worked out in minute detail. Despite this work, however, little attention has been given to improving the quality and yield of the desired amides by improving the process by which the reaction is carried out, and such work has largely been devoted to batch reactions.

In some cases, continuous batch reactions have been worked out wherein one or more of the reactants is continuously added to the body of reaction mixture and a portion of the reaction mixture is continuously withdrawn. As with all batch reactions, however, the reaction time is usually quite long, color is formed in the reaction mixture due to decomposition and side reactions, and large quantities of reaction mixture must be processed in order to recover the desired product.

It is accordingly an object of this invention to provide an improved process for effecting the condensation of an ester with an amine to form the amide.

Another object of the invention is to provide a process whereby an ester and an amine are continuously and progressively condensed under conditions whereby amide of improved quality is continuously produced and recovered without the concomitant formation of objectionable colored decomposition products and unwanted by-products, and without the necessity of processing large volumes of reaction mixture in order to recover the desired amide.

Another object of the invention is to provide an improved process for preparing amides by the condensation of esters and amines without the disadvantages inherent in batch operations.

Other objects will be apparent from the description and claims which follow.

These and other objects are attained by means of this invention which is concerned primarily with an improved method of effecting the well known condensation between an ester and an amine to form an amide whereby product of improved quality is continuously produced. One of the primary advantages of this invention lies in adapting the amine-ester condensation to commercial operations in which batch reactions give objectionable results. I have found that the condensation of an amine with an ester can be greatly improved by progressively introducing the amine and ester into the top of a reaction zone, continuously flowing the resulting mixture downwardly through the reaction zone away from the point of introduction in the form of a thin film, continuously distilling the alcohol formed in the condensation away from the flowing stream without, at the same time, distilling the reactants or product, and continuously withdrawing the desired amide product in highly purified form from the bottom of the reaction zone.

By means of this invention the reaction time for any increment of the reaction mixture is a relatively few minutes as compared to as much as several hours for corresponding batch reactions. The color of the reaction product prepared in accordance with this invention is greatly improved over the product formed by batch reactions, and the product as obtained in crude form has a melting point or boiling point closely approaching that of recrystallized amide. Thus by means of this invention the processing of large quantities of reaction mixture is avoided as well as the necessity for extensive purification of the product. In effecting the condensation in accordance with this invention, an ester is chosen which will form an alcohol in the condensation which has a distilling temperature below the distilling temperatures of the amine, ester and amide. The nature of the amine and ester is not critical and any of the condensations known or to be inferred from the art can be carried out in accordance with this invention. It is usually desirable, although not necessary, to employ an alkyl ester of a monocarboxylic acid in practicing the invention, and ordinarily the lower alkyl esters such as the methyl, ethyl, propyl or butyl esters are preferred.

In the process the alcohol is continuously distilled from the reaction mixture as soon as it is formed. This can be readily done by distilling the alcohol out of the reaction zone countercurrent to the flowing liquid stream of reactants. In this way, each increment of reaction mixture flows away from the point of introduction of the reactants into the reaction zone and becomes purer and purer. By continuously removing the alcohol as it is formed, the reaction readily goes to completion in the relatively few minutes during which the mixture is in the reaction zone. When both reactants are liquids, they can be introduced in equivalent molar quantities to the top of the reaction zone at a rate such that reaction is substantially complete by the time the reaction mixture reaches the bottom of the reaction zone. In this way, the product which is withdrawn at the bottom of the reaction zone is essentially pure amide in quantitative yield. When one of the reactants is a solid and the other reactant is a liquid, the solid reactant can be dissolved in an excess of the liquid reactant whereby the product being withdrawn consists of a mixture of the desired amide and excess liquid reactant. In this event, the product can be cooled whereby the amide crystallizes out and can be filtered off and the liquid reactant recycled to the top of the reaction zone.

The thin film reaction of this invention can be carried out in any desired manner wherein the reactant mixture can be flowed in a thin film and alcohol continually distilled out of the flowing film as the alcohol is formed. A simple but highly effective method for effecting the process involves merely passing the reaction mixture downwardly through a heated packed column such as is well known in the art. The rate of product formation will, of course, depend upon the size of the packed column employed since the reactants can be added at any desired rate up to the point where the column becomes flooded. With a reaction column having a length of 5 feet and a diameter of 4 inches, product has been formed at rates as high as 10 kg. per hour. Thus the process is readily adapted for commercial production since in the 5 or 6 hours normally required for a single batch reaction, 50 to 60 kg. of high quality amide can be produced in accordance with this invention using a relatively small reaction column.

The amine which is employed is desirably a primary amine, although secondary amines can also be used. The amine can be an aliphatic amine or an aromatic amine, and it can contain substituent groups which do not react with the ester. Similarly, the ester can be an ester of an aliphatic monocarboxylic acid or an aromatic monocarboxylic acid as desired. As with the amine, the ester can contain any of a variety of substituent groups which do not react with the amino group. Such variations in the reactants themselves are well known in the art, and it is not intended that this invention shall be limited by the particular nature of the amine and ester employed. The ester groups are desirably either phenyl groups or alkyl groups of 1 to 8 carbon atoms. Usually the alkyl groups containing 1 to 4 carbon atoms are preferred to facilitate the continuous distillation of the alcohol from the film of reaction mixture.

The process of this invention has a further advantage that the process can be run continuously for prolonged periods of time with uniform results, and with a minimum of supervision. Thus, once the reaction rate for optimum conversion has been established, the reactants can be fed into the reaction zone at the predetermined rate and product continuously withdrawn without necessitating any further manipulative steps.

The invention can be illustrated by the following examples of preferred embodiments thereof. It will be understood that the examples are included merely for purposes of illustration and are not intended to limit the scope of the invention unless otherwise specifically indicated.

*Example 1*

A mixture of 46.6 parts by weight of aniline and 105.7 parts by weight of ethyl benzoyl acetate is progressively introduced at the top of a reaction zone defined within a 1-inch column having a length of 23 inches packed with ⅛ inch glass helices. The reaction zone was maintained at a temperature of about 135° C. The reaction mixture was continuously flowed down through the packed column whereby it was spread in a thin film on the packing. As the reaction proceeded, ethyl alcohol was continuously distilled up through the column and removed from the top of the reaction zone. Crude benzoylacetanilide was continuously withdrawn from the bottom of the column at the rate of 200 parts by weight per hour. The crude product which was obtained was almost white and had a melting point in the crude form of 104–105° C. After being recrystallized, the purified product had a melting point of 105.5–106.5° C. In contrast to this, amide formed from the same two reactants in a batch process in accordance with well known practice was highly colored in the crude form. The product obtained from this batch process was a reaction mixture which had to be processed in order to recover the desired amide. The amide had a melting point of 104°–105° C. only after four washing operations. This product then resembled the crude product continuously produced by the process of this invention. After the batch process product had been recrystallized, it had a melting point of 106–106.5° C.

It is thus apparent that the present process produces a high quality product as the initial product withdrawn from the reaction zone and thus obviates the necessity for extensive purification which is necessary with the reaction mixture obtained in a batch operation.

*Example 2*

A solution of 8 parts by weight of normally solid 2-methoxy-4-nitroaniline in 50 parts by volume of ethyl benzoylacetate was progressively passed through a packed column maintained at about 135° C. The product, 2-(benzoylacetamido)-5-nitroanisole, was formed at the rate of 100 parts by weight per hour. This crude product had a melting point of 179–180° C. as compared to a melting point of 130–150° C. for the crude product obtained from a batch process. Upon recrystallization, the melting point of the product prepared in accordance with this invention remained unchanged, whereas the batch process product showed a purified melting point of 179–180° C. This reaction was readily effected in continuous fashion since the product was washed out of the reaction zone in the excess ester employed and was readily crystallized out of the ester by cooling. The excess ester was then recovered and recycled to the top of the reaction column.

*Example 3*

A solution of 13.5 parts by weight of phenyl 1-hydroxy-2-naphthoate in 15.3 parts by weight of γ-(2,4-di-tert-amylphenoxy) butylamine and 5 parts by volume of xylene warmed to 50° C. was progressively passed through a packed column maintained at a temperature sufficient to volatilize the liberated alcohol. The rate of formation of product was 225 parts by weight per hour. The crude product obtained by the process of this invention was just off white as compared to a tan color for the batch process product. In contrast to this, the product obtained by a batch process had a melting point in crude form of 108–114° C. and of 123–125° C. after recrystallization. The product embodying this invention was almost white after recrystallization, whereas the batch process product remained tan even after recrystallization.

*Example 4*

A solution of 13.2 g. of phenyl 1-hydroxy-2-naphthoate and 12.1 g. of 4-tert-butyl-4-amino diphenyl ether in 25 ml. of hot xylene was condensed in accordance with this invention by being passed through a hot packed column. A high quality product was collected from the bottom of the column at the rate of 50 g. per hour.

Similar improved results are obtained with any of the other well known amines and esters which can be subjected to a condensation reaction of this kind. In accordance with this invention, the rate of product formation is high, and the product is of excellent quality in the form removed directly from the reaction. The thin film reaction proceeds rapidly whereby quantitative conversion of at least one of the reactants and often both of the reactants is continuously obtained. The process of the invention can be carried out on simple equipment, and it is not necessary to heat or cool large volumes of reactant contained in a large capacity reactor as in the case of batch processes. As can be seen from the examples, the undesirable color which is commonly obtained in batch reactions usually remains even after purification of the product. As a consequence, the process of this invention has the further advantage of producing amide of good color initially, which is particularly important for many applications. Thus, for example, many of the amides are used in photographic applications and particularly in color photography wherein the presence of color in the product is highly objectionable. By means of this invention, the results obtained from well known chemical reactions involving condensation of an ester and an amine are greatly improved. The production of amide on a commercial scale is greatly facilitated, and the reaction is readily controlled to give large scale results comparable with the results which are usually obtained only on a laboratory scale. Although a packed column furnishes a ready means for effecting the thin flowing film reaction, the reaction can be carried out in any of the apparatus known to the art. Thus, for example, the reaction can be carried out in a flowing film in an unpacked column or on an inclined surface, or in any other desired manner.

Although the invention has been described in deatail with particular reference to preferred embodiments thereof, variations and modifications can be effected within the spirit and scope of the invention as described hereinabove and as defined in the appended claims.

I claim:

1. In the formation of an amide by condensation of an amine with an ester wherein the reactants are selected from the combinations of amine and ester reactants consisting of (a) aniline and ethyl benzoyl acetate; (b) 2-methoxy-4-nitroaniline and ethyl benzoyl acetate; (c) γ-(2,4-di-tert. amylphenoxy) butylamine and phenyl-1-hydroxy-2-naphthoate; and (d) 4-tert. butyl-4-aminodiphenyl ether and phenyl-1-hydroxy-2-naphthoate with the concomitant liberation of a hydroxy compound, the improvement in effecting the condensation to form the corresponding amide without objectionable color formation which comprises progressively introducing said amine and said ester into an upper zone of a packed column maintained at a temperature above the distilling temperature of said hydroxy compound but below the distilling temperature of said amide, amine and ester, continuously flowing the mixture of said amine and said ester downwardly through the packed column in a thin flowing film on the packing, continuously distilling said hydroxy compound upwardly through the column, continuously withdrawing said hydroxy compound from the top portion of said column, and continuously withdrawing said amide from the bottom of said column.

2. In the formation of an amide by condensation of an amine with an ester wherein the reactants are aniline and ethyl benzoyl acetate with the concomitant liberation of a hydroxy compound, the improvement in effecting the condensation to form the corresponding amide without objectionable color formation which comprises progressively introducing said amine and said ester into the top of a packed column maintained at a temperature above the distilling temperature of said hydroxy compound but below the distilling temperature of said amide, amine and ester, continuously flowing the mixture of said amine and said ester downwardly through the packed column in a thin flowing film on the packing, continuously distilling said hydroxy compound upwardly through the column, continuously withdrawing said hydroxy compound from the top of said column, and continuously withdrawing said amide from the bottom of said column.

3. In the formation of an amide by condensation of an amine with an ester wherein the reactants are 2-methoxy-4-nitro-aniline and ethyl benzoyl acetate with the concomitant liberation of a hydroxy compound, the improvement in effecting the condensation to form the corresponding amide without objectionable color formation which comprises progressively introducing said amine and said ester into the top of a packed column maintained at a temperature above the distilling temperature of said hydroxy compound but below the distilling temperature of said amide, amine and ester, continuously flowing the mixture of said amine and said ester downwardly through the packed column in a thin flowing film on the packing, continuously distilling said hydroxy compound upwardly through the column, continuously withdrawing said hydroxy compound from the top of said column, and continuously withdrawing said amide from the bottom of said column.

4. In the formation of an amide by condensation of an amine with an ester wherein the reactants are γ-(2,4-di-tert. amylphenoxy)butylamine and phenyl-1-hydroxy-2-naphthoate with the concomitant liberation of a hydroxy compound, the improvement in effecting the condensation to form the corresponding amide without objectionable color formation which comprises progressively introducing said amine and said ester into the top of a packed column maintained at a temperature above the distilling temperature of said hydroxy compound but below the distilling temperature of said amide, amine and ester, continuously flowing the mixture of said amine and said ester downwardly through the packed column in a thin flowing film on the packing, continuously distilling said hydroxy compound upwardly through the column, continuously withdrawing said hydroxy compound from the top of said column, and continuously withdrawing said amide from the bottom of said column.

5. In the formation of an amide by condensation of an amine with an ester wherein the reactants are 4-tert. butyl - 4 - aminodiphenylether and phenyl - 1 - hydroxy - 2 - naphthoate with the concomitant liberation of a hydroxy compound, the improvement in effecting the condensation to form the corresponding amide without objectionable color formation which comprises progressively introducing said amine and said ester into the top of a packed column maintained at a temperature above the distilling temperature of said hydroxy compound but below the distilling temperature of said amide, amine and ester, continuously flowing the mixture of said amine and said ester downwardly through the packed column in a thin flowing film on the packing, continuously distilling said hydroxy compound upwardly through the column, continuously withdrawing said hydroxy compound from the top of said column, and continuously withdrawing said amide from the bottom of said column.

References Cited in the file of this patent

UNITED STATES PATENTS

| | | |
|---|---|---|
| 2,130,523 | Carothers | Sept. 20, 1938 |
| 2,217,263 | Waterman et al. | Oct. 8, 1940 |

FOREIGN PATENTS

| | | |
|---|---|---|
| 237,400 | Switzerland | Sept. 1, 1945 |

OTHER REFERENCES

Sunderland et al.: "Jour. Oil and Col. Chemists Assn.," vol. 353, November 1949, pp. 511 to 529.